United States Patent [19]
Thompson

[11] 3,930,624
[45] Jan. 6, 1976

[54] AIRCRAFT

[76] Inventor: Richard R. Thompson, 732 S. Matlack St., West Chester, Pa. 19380

[22] Filed: July 9, 1973

[21] Appl. No.: 377,469

[52] U.S. Cl. ................................................ 244/13
[51] Int. Cl.² ............................................ B64C 1/00
[58] Field of Search ............ 244/13, 14, 16, 37, 38, 244/44, 47, 64, 119, 153 R, 153 A, 154, 155 R, 155 A, DIG. 1; 46/76 R, 78

[56] References Cited
UNITED STATES PATENTS

| | | | |
|---|---|---|---|
| 591,211 | 10/1897 | Daberer | 244/154 |
| 992,086 | 5/1911 | Tweedale | 244/155 R |
| 1,014,194 | 1/1912 | Williams | 244/14 |
| 1,558,958 | 10/1925 | Williams | 244/37 |
| 2,035,730 | 3/1936 | Trevor | 244/154 |

FOREIGN PATENTS OR APPLICATIONS

| | | | |
|---|---|---|---|
| 26,568 | 10/1909 | United Kingdom | 244/13 |
| 6,657 | 6/1914 | United Kingdom | 244/153 R |

Primary Examiner—Trygve M. Blix
Assistant Examiner—Jesus D. Sotelo
Attorney, Agent, or Firm—C. Walter Mortenson

[57] ABSTRACT

An aircraft having a major longitudinal strength structure generally centralized in the vertical mid-plane. Shallow V-shaped wing panels are secured to the longitudinal strength structure, one at the top and one at the bottom to define a rhombic cellular configuration. Control linkages are provided, positioned and connected to act as stays between paired of upper and lower wing panels.

20 Claims, 16 Drawing Figures

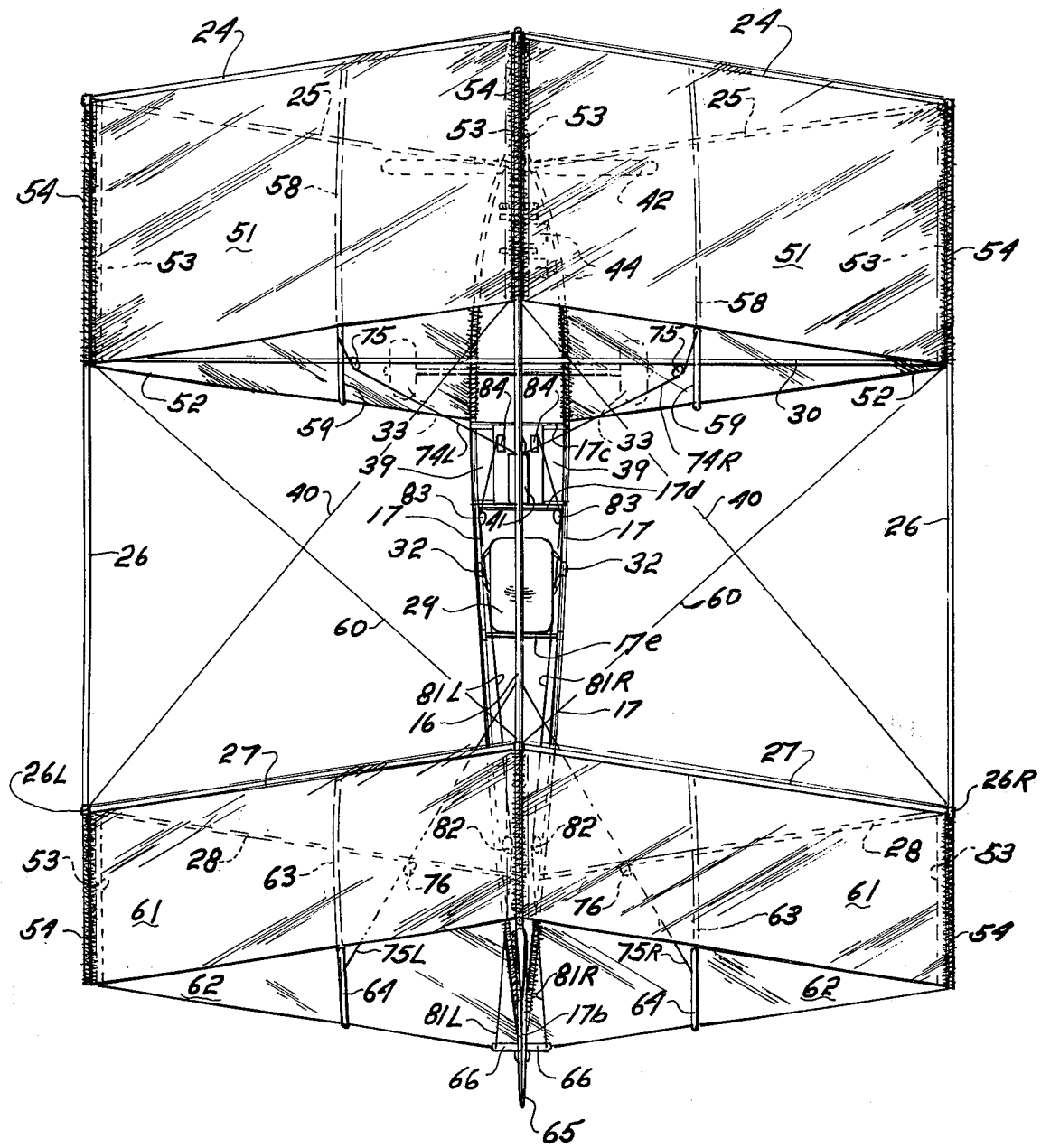

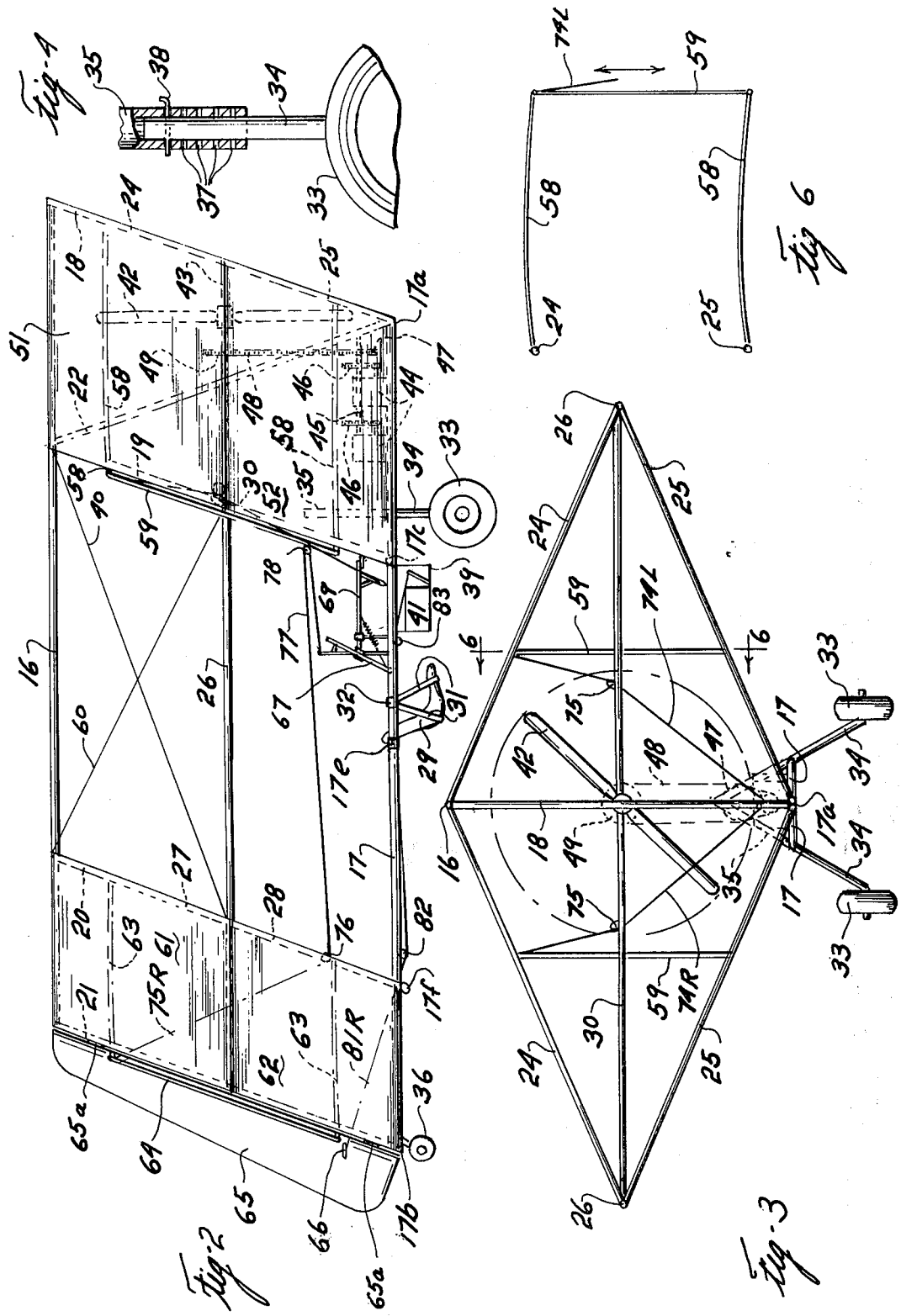

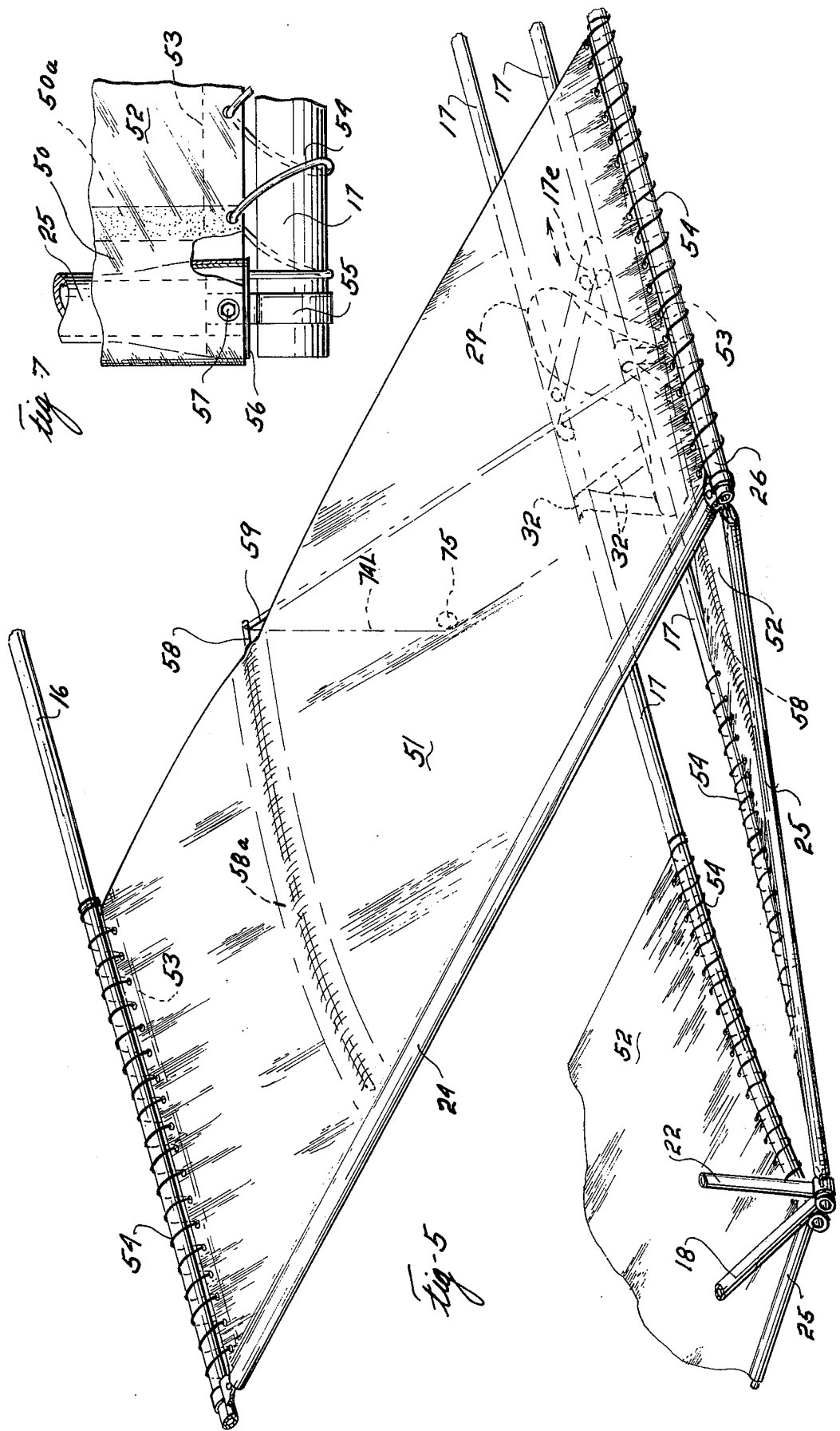

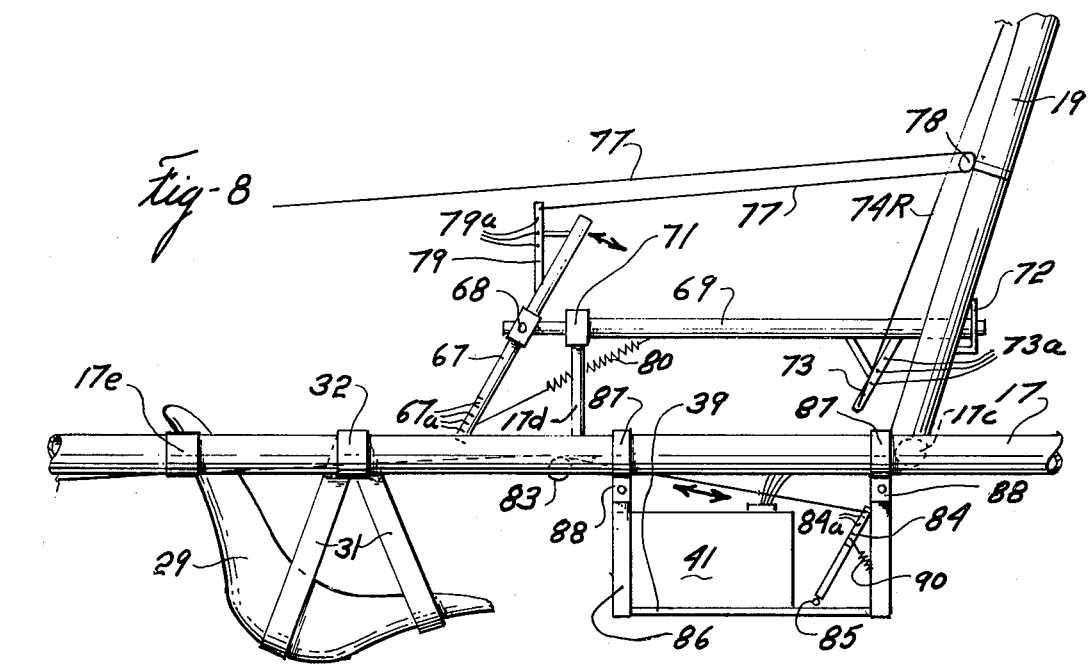
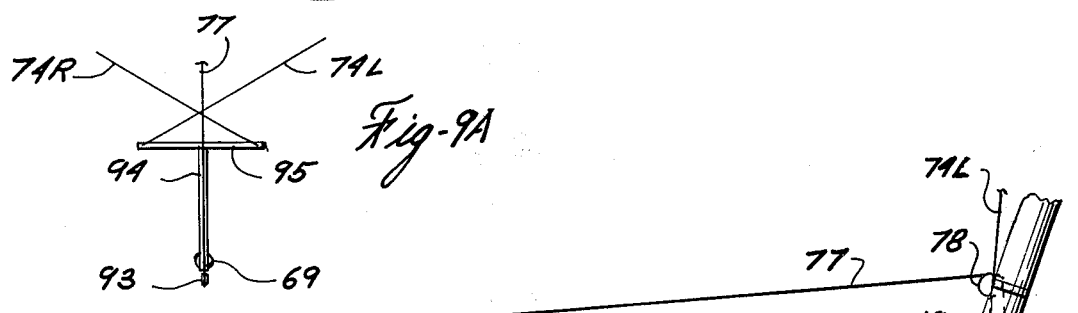
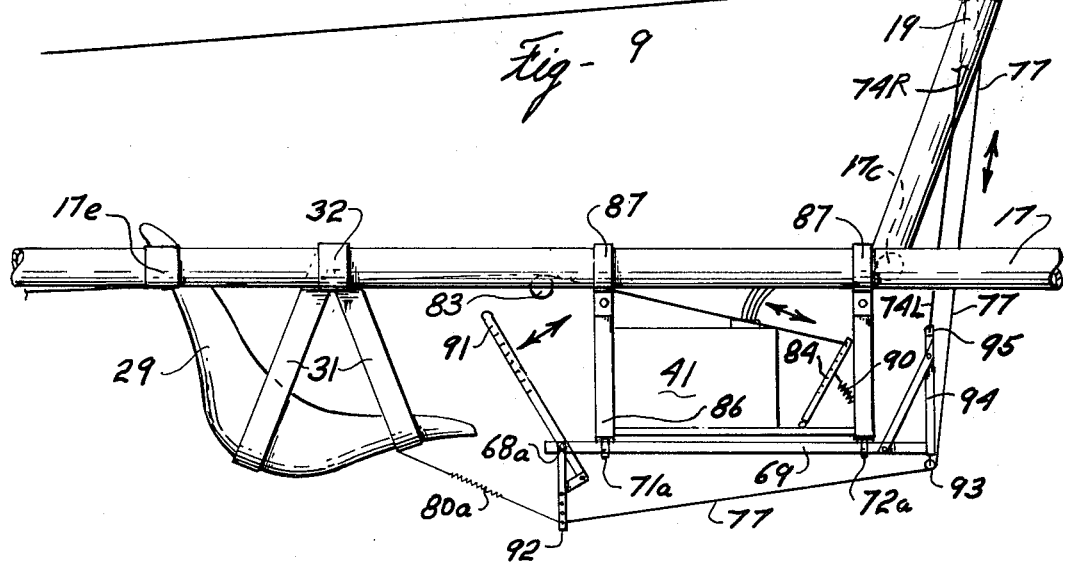

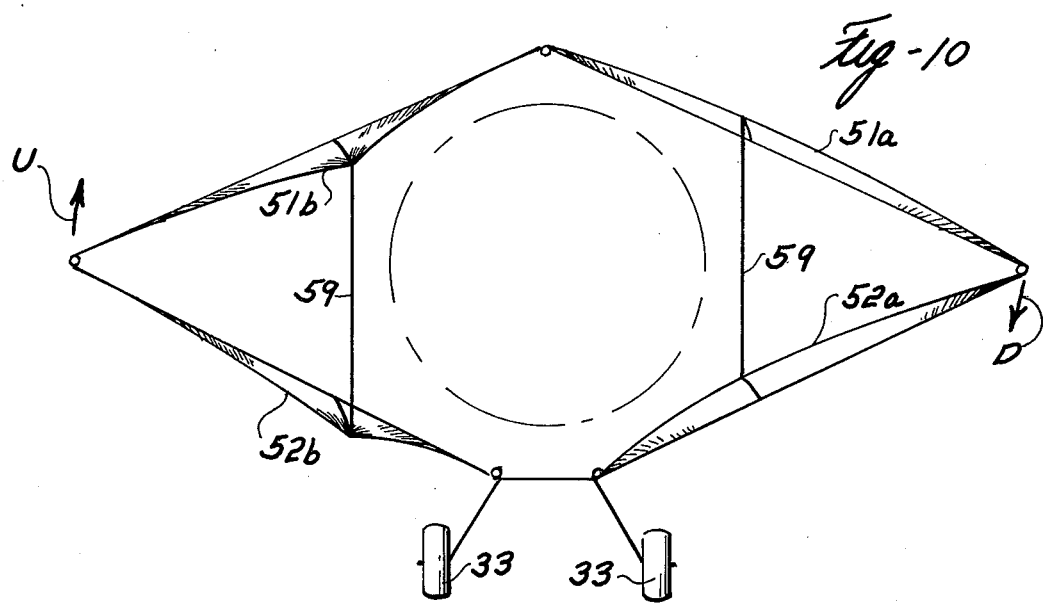
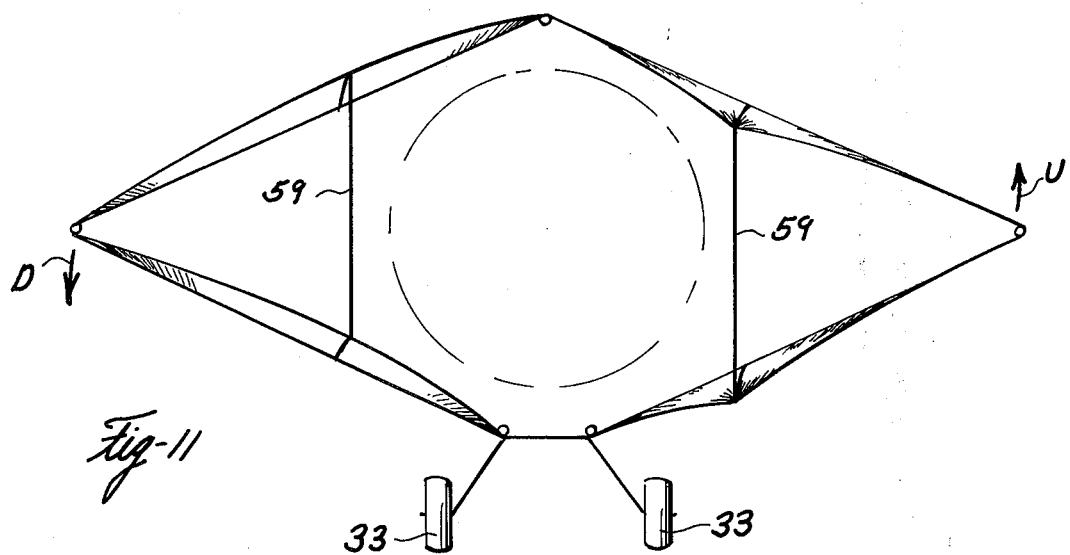
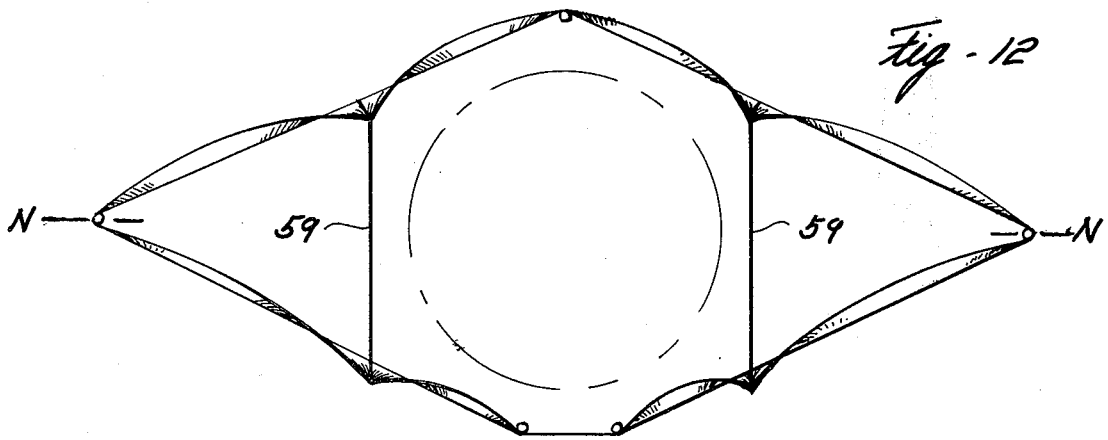

AIRCRAFT

This invention relates to aircraft having one or more wings of substantially rhombic configuration, viewed axially of the aircraft, and especially to such aircraft wherein paired positive-lift rhombic wings are disposed toward the ends of the aircraft and cooperate with a substantially triangulated aircraft framing.

The principal object of the invention is to attain exceptional compactness, light weight with strength, light wing-loading, low landing-speed, stability, safety, simplicity, ease of assembly, disassembly, inspection, adjustment and repair, and facility of control operation of an aircraft, and at moderate cost.

How the foregoing and other objects and advantages of the present invention are obtained will be evident from the following description, taken together with the accompanying drawings, in which drawings:

FIG. 1 is a plan view of the present preferred embodiment of an aircraft in accordance with this invention;

FIG. 2 is a right side elevation of the aircraft;

FIG. 3 is a front elevation thereof;

FIG. 4 is an enlarged detail showing the adjustable mounting of one of the landing gear struts in one of the diagonal bracing members of the fuselage;

Figure 13:
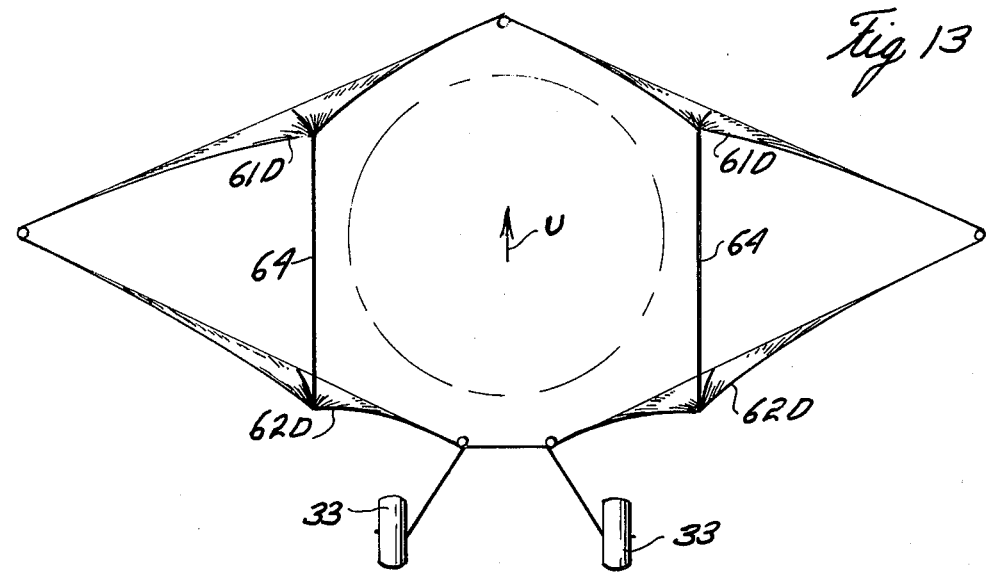
Figure 15:
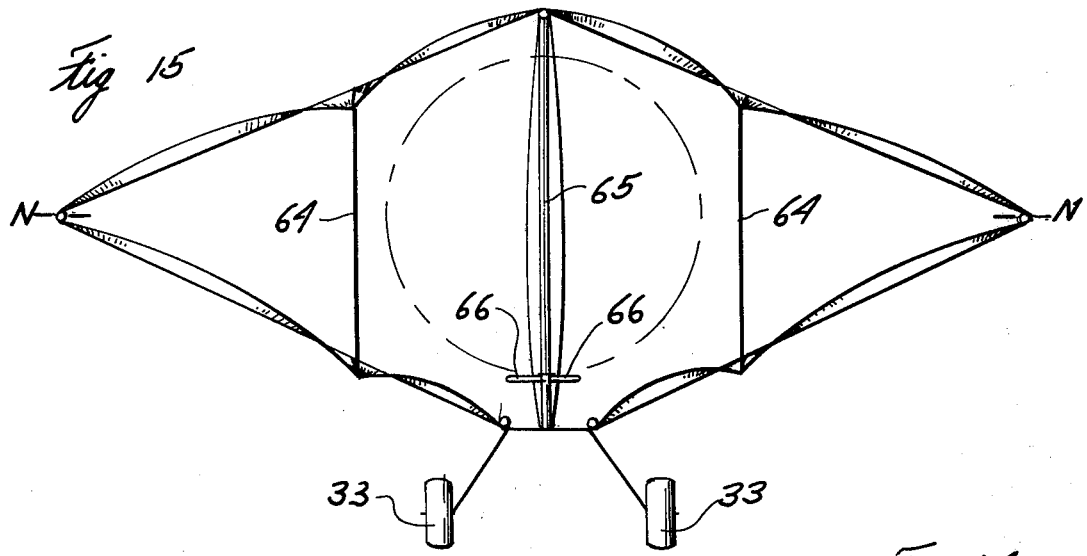
Figure 14:
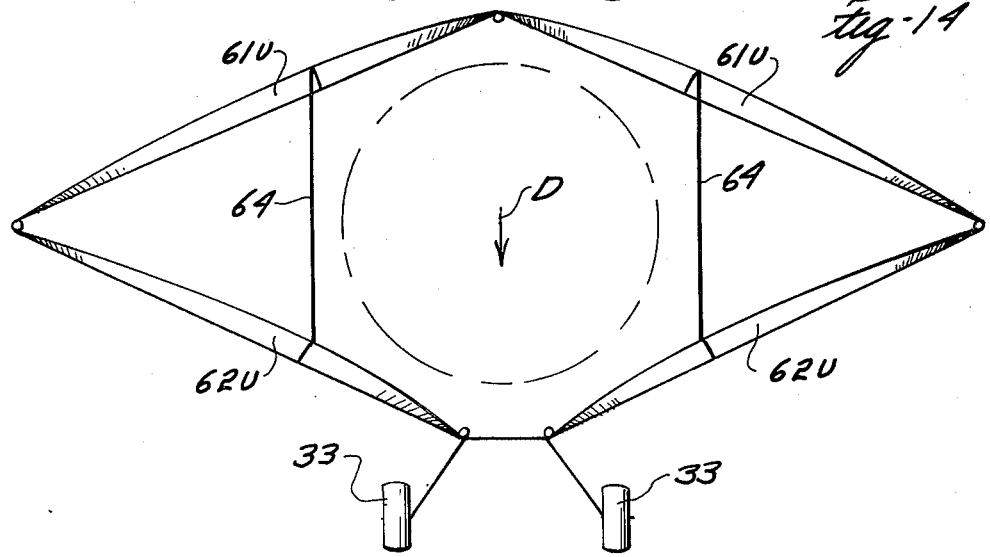

FIG. 5 is a fragmentary, three-quarter left front view, taken somewhat from above, and to a larger scale than FIGS. 2 and 3, showing the upper and lower left-hand panels of the front wing and a portion of the lower right-hand panel, also showing the lacing of the flexible wing material to certain longitudinal structural members, and further showing the main ribs of the left wing panels (slipped into pockets therein), and the control link between said ribs;

FIG. 6 is a simplified view of said ribs and control link taken about as indicated by the arrows 6-6 on FIG. 3;

FIG. 7 is an enlarged fragmentary detail, related to FIG. 5, showing a typical fastening between one of the longerons and one of the wing spars, and a typical fastening of the wing surface material to said members;

FIG. 8 is a fragmentary view, to a larger scale, of the lower central portion of FIG. 2, showing, in relation to the main longitudinal framing, the pilot's seat and adjacent parts of the control system, including rudder control and hanging stick for lateral and pitching control, and certain other parts in that region, and also showing adjustable control biases as well as other adjustment devices;

FIG. 9 is a view like FIG. 8 but showing, as an alternative, a bottom-mounted control stick;

FIG. 9A is a detail of the forward portion of the control mechanism of FIG. 9, viewed from the right of that Figure;

FIG. 10 is a substantially diagrammatic transverse sectional view through the aircraft, taken aft of the front wing assembly and looking forward toward said wing assembly, illustrating a control operation by the flexure of the wing panels in a sense to effect a right bank or roll as indicated by the arrows at the wing tips;

FIG. 11 is a similar view, illustrating a control operation for left bank or roll;

FIG. 12 is a similar view, showing the controllable wing surfaces disposed symmetrically at both sides, and thus laterally neutral;

FIG. 13 is a diagrammatic view from the rear of the aircraft, illustrating a control operation on the rear wing assembly for raising the tail, and thus effecting a downward pitching operation of the aircraft;

FIG. 14 is a similar view illustrating the operation for lowering the tail, as for a climbing operation of the aircraft; and FIG. 15 is a similar view illustrating a control setting for cruising operation of the aircraft. This view also illustrates the rudder, as seen in mid-position--which is omitted from FIGS. 13 and 14, for the sake of simplicity.

A typical aircraft employing the present preferred embodiment of the invention is illustrated in the drawings, some of which are structural; and some more or less diagrammatic, especially for illustration of control operations.

By reference first to FIGS. 1 to 3, it will be seen that the aircraft comprises framing or fuselage structure, generally centralized upon the longitudinal, vertical, mid-plane, and triangulated in that plane, so as to provide vertical and longitudinal stiffness. It further comprises generally transverse framing, in the form of wing spars, which are also triangulated, so that, in cooperation with the longitudinal framing there is substantial transverse stiffness, even though the basic structure is itself quite light. Further, in the preferred embodiment, wing spar assemblies are provided at or near each end of the aircraft, each such assembly being generally rhombic in configuration, when viewed axially of the aircraft, each such rhombic assembly preferably having a longer horizontal axis than vertical axis. The outer tips of these two assemblies are joined by longitudinal spars, one on each side of the aircraft. There is also a transverse brace, or stiffener between the latter.

More specifically, the central, generally vertical framing, preferably comprises an uppermost longitudinal member 16; at least one, but in this case a pair of, bottom longitudinal members 17, 17, vertical diagonal members 18, 19, 20 and 21, and a reversely angled vertical diagonal member 22, which with members 18 and 19 forms an N-structure, stiffening the central, vertical framing in the vicinity of the power-plant and the forward wing. The longitudinals 17,17 (as seen in the plan view of FIG. 1 and the front elevation of FIG. 3) are bent toward each other, at each end, so that they are joined together at point 17a where they are connected with the lower ends of diagonals 18 and 22, at the front end of the aircraft; and, similarly, they are joined together at the rear end, at 17b, where they are connected with the rearmost diagonal upright 21, which latter also supports the hinged rudder, as hereinafter referred to.

In case only a single, central, bottom longeron member 17 is employed, the pilot may straddle the same, or seats may be disposed at each side of such member; but in the present case there are two such members, which arrangement has certain advantages with respect to pilot seat location (as will be brought out hereinafter). Also, this arrangement, with diagonal and cross-braces, provides considerable torsional stiffness for the aircraft. Such crossbraces (as shown in FIGS. 1, 2, 5 and 8) are preferably provided at 17c, 17d, 17e and 17f; and some of these will be hereinafter further referred to. Brace 17d may be an inverted V.

The aircraft is provided with one or more (in the preferred embodiment, two) positive-lift wings, which, when viewed axially of the aircraft, are of generally rhombic configuration; each wing having triangulated spar structure which has the added function of stiffening the fuselage. Thus, the spar structure of the forward rhombic wing cellule comprises upper spar members 24,24, secured to the forward end of upper longitudinal 16 and to the upper end of the diagonal upright member 18, and lower spar members 25,25, secured to the lowermost longerons at 17a, where the lower ends of diagonals 18 and 22 are fastened. The outer ends of spars 24 and 25, at each side of the aircraft, converge; and, in the preferred embodiment, they meet at, and are fastened to, the forward end of a side longeron 26.

The rear wing spar structure is similar to that above-described. It comprises upper strut members 27, 27, and lower strut members 28, 28; those numbered 27 being secured at a common point to upper longeron 16, and those numbered 28 being secured to the lower structure 17, 17, adjacent the cross-brace 17f, to which latter the central diagonal brace 20 is secured. At each side of the aircraft the converging pair of struts 27 and 28 connect with a side longeron 26, at 26R on the right side of the aircraft and at 26L on the left side. From those junction points the side longerons extend back a distance equal to the chord of the rear wing to support the same in the manner hereinafter described.

Between the fore and aft wings, but preferably close to the trailing edge of the forward wing, is a transverse tubular brace 30, extending completely across the aircraft, and interconnecting the extreme side longerons 26, 26, to stiffen the entire structure in all senses. At mid-point it is secured to the oblique upright 19. Wire bracing 40, 40, 60, 60 is also employed.

Before turning to the matter of the wings themselves, the rudder, and the control system, certain additional structural features and other elements of the aircraft will be dealt with. From FIGS. 1 to 5 and 8, it will be seen that there is a pilot seat 29, disposed substantially amidships, both longitudinally and laterally considered. This is preferably suspended from, and between, the two lowermost longerons 17, as by means of slings 31 and brackets 32, and preferably also by the cross-member 17e. For comfortable location of the pilot, as well as for adjustment in the longitudinal location of the center of gravity, the brackets 32 and cross-member 17e may be variably located on and fastened to the longerons 17; and inclination of the seat is also adjustable by varying the height of the seat back where it attaches to the movable cross-member 17e. By using a pair of longerons 17, slightly spaced apart (instead of a single, central, longeron) not only is it possible to suspend the pilot's seat very low, which helps to lower the overall C.G., but also the pilot himself may assist in ground-maneuvering of the aircraft, with his feet; and, in the event of certain ground accidents, such as a roll-over of the aircraft with a wind-gust, the pilot can readily slip out of the seat, completely disengaged from the aircraft.

Somewhat forward of the pilot's location is a pair of main landing wheels 33, having their axles secured to a pair of upwardly and inwardly converging struts 34 (see also FIG. 4), and these struts are telescopically associated with tubular supports 35, which serve also as transverse diagonal braces extending from the longerons 17 upwardly and inwardly to a junction with the oblique vertical midbrace 19. Although a yielding shock strut could be provided in place of each undercarriage strut 34, this is normally not required in the present aircraft, which has a low-speed landing capability. However, for the sake of fixed adjustment of the undercarriage height, and for the sake of altering the ground angle of the aircraft, which is determined by the location of the two forward wheels 33 and the rear wheel 36, the telescoping of each wheel strut 34 within its brace 35 may be adjusted and set, by means of a series of apertures 37 in the latter, and a pin 38 which passes through any one of said apertures and a registering aperture in the strut 34.

Between the location of the main wheels 33 and the pilot's seat 29, and relatively close to the transverse vertical plane containing the C.G. of the aircraft as a whole, is the fuel tank 41, located between the floor boards 39 (see particularly FIG. 1). At this general area are also the pilot's controls which will be hereinafter referred to in detail.

Between the main wheels 33 and the forward end of the aircraft, is the thrust producing system, which in the present embodiment comprises a propeller 42, mounted on a drive shaft 43, extending between bearings in the upwardly diverging central vertical braces 18 and 22. The center of thrust of this propeller (as seen from FIGS. 2 and 3) is substantially on the longitudinal axis of the fore and aft wings, and thus not far from the center of drag of the aircraft. Adjustment of the angle and or vertical location of the propeller shaft and thus of its thrust may be obtained by adjustment of the shaft bearings (not shown) on the generally upright braces 22 and 18.

For reliability, it is preferable to utilize two engines 44, which drive a common shaft 45, through suitable gearing 46. The engines are supported from the longerons 17, and may have adjustable mountings relative thereto, in both the longitudinal and vertical senses. A sprocket 47, on shaft 45, drives one or more chains or belts 48, passing around a sprocket 49 fixed on the propeller shaft 43.

The low disposition of the pilot, fuel, undercarriage, engines, etc., serves to locate the C.G. of the aircraft well below the aerodynamic center of lift and contributes greatly to stability in roll and pitch, while the vertical areas presented by the dihedral and cathedral of the rhombic wings provide excellent yaw stability, giving the stable control characteristics necessary for slow speed flight.

Turning now to the wing surfaces, the controls, and certain other features, it should be pointed out first, with reference to the forward wing cellule, that this is made of four panels, made chiefly of sail-like or flexible material. Although many different materials may be used, there may be mentioned a few, such as: flexible plastic sheeting, heavy cellophane, rubberized nylon, or the like, some of which are available under various trademarks such as MYLAR, DACRON, TYVEC, FACILON, and others. A coated fabric which is elastically yielding in all directions of its plane, is in some respects preferable, since the preferred arrangement of the aircraft involves obtaining control in the rolling and pitching senses by means of deformation of at least the trailing edge portions of the surfaces of the wings.

The upper panels of the forward longitudinal wing cellule are indicated at 51, 51, and the lower panels are indicated at 52,52. These panels are of similar span and similar chord, but are so cut and so disposed that there is a sweep-back of the upper panels and a sweep-forward of the lower panels, with their extreme outer ends so disposed as to be co-extensive. The side longerons 26 extend from the extreme forward junctions of the forward wing tip to the extreme rearward junctions of the rear wing tips.

For easy assembly, strength, and economy, each panel of flexible material may have a fold or a hem at its extreme inner and its extreme outer edges, as indicated at 53, cemented or otherwise fastened to the main surface, and along those edges, the surfacing may be laced at 54 to the struts or tubular structural members 16, 26, 26; and, for the lower panels, to the lower longerons 17. The lacing 54 may readily be adjusted to be tighter or looser, thereby altering the effective camber of the wings. The flexible material of each wing panel may be formed at the leading edge with a hem 50, turned back and cemented at 50a (see FIG. 7) to receive the wing strut. The hemming of the leading edges of the fore and aft wing panels, through which the several struts 24, 25, 27 and 28 pass, and the cementing of the hems, is, for the sake of a clear showing of all the struts, omitted from all the Figures excepting FIG. 7, in which latter it is shown at 50 and 50a.

The joints between the various longerons, struts and other tubular members of which the main framing and braces are generally composed, may be very simply made, by means of strap members, such as shown at 55 in FIG. 7, each such strap passing around a tube member, e.g. 17, and being fastened directly to a strut member, e.g. 25, or indirectly thereto by means of a tapered collar member 56, by means of a through-bolt or the like 57. In this way, it is also quite easy to adjust the angularity between structural members, when assembling.

For maintaining the general aerofoil contour of the surface of each wing panel, one or more curved ribs 58 (preferably of light weight tubular construction) may be employed in each panel. Each panel may have a plurality of such ribs, although only one is here shown in each panel.

These ribs 58 are shown generally diagrammatically in FIG. 6. They may be fastened or simply slipped into pockets in or on the wing surfacing as shown by the securing pocket or strip 58a in FIG. 5. At the rear of the wing cellule, at least one upper rib 58 and one lower rib 58 are coupled together, for stability, by a link 59, which also serves as a control link; the two links 59, one on either side of the aircraft, being differentially movable in a vertical sense, so as to regulate the trailing edges of the forward wing surfaces in the manner of ailerons, for lateral or rolling control. The connection of these links to the pilot's control system will be described hereinafter.

A very similar arrangement is utilized for the four wing panels of the rear wing, seen at 61, 61 (the upper rear surfaces) and 62, 62 (the lower rear surfaces). However, the trailing edges of these wing surfaces are controlled in unison, since they are to act in the sense of an elevator, for pitching control of the aircraft. Contour ribs 63, 63 are provided (like those numbered 58 for the forward wing), and the rear ends of the upper and lower ribs are coupled by positioning and control links 64, 64. The connection of these with the pilot's control system will be hereinafter described.

For directional control there is a rudder 65, hinged at 65a, 65a, to the rear centralized oblique brace member 21, which thus serves as the rudder post, as well as for fuselage structure and for mounting the tail wheel 36. Right and left control horns 66 are provided on the rudder 65.

From FIG. 8, it will be seen that there is a hanging control stick 67 secured by transverse pivot 68 to the longitudinal rock shaft 69, supported by fixed bearings, or hinges, 71, 72. Bearing 71 may be fixed to the inverted V-brace 17d. Near its forward end, the rock shaft 69 carries a control arm 73, for lateral control. From this arm, there extend upwardly and laterally the left and right control cables 74L, 74R (see also FIGS. 1 and 3), which pass over pulleys 75, 75, respectively, mounted upon cross structural member 30, and from thence these cables are connected to the left and right control links 59, respectively. Lateral swinging of the pilot's stick 67, will correspondingly rotate the rock shaft 69, and will swing what may be termed the aileron control arm 73. A swing of the control stick 67 to the right will relax the pull on the cable 74R and will produce a tension on the cable 74L. This will permit a bowing upward of the trailing edges of the right wing panels 51, 52, as shown at 51a, 52a (in FIG. 10) and will cause a downward deflection of the trailing edges of the left wing panels, as shown at 51b, 52b—thus producing increased lift at the left side of the aircraft, as shown by arrow U in FIG. 10, and a decreased lift at the right side as shown by arrow D, indicating that the left wing will tend to be going up and the right wing to be going down, for a right bank or roll.

Exactly the reverse effect will occur (as shown in FIG. 11) when the pilot's control stick 67 is swung to the left.

A neutral condition or setting of the lateral control is indicated by the level lines N in FIG. 12.

The contour and disposition of the wings are so arranged that there is generally a positive-lift action effective on the surfaces, including the trailing portions thereof, so that the controls need only operate in tension. Thus, as the control cable 74L is pulled, to pull down upon the left control link 59, the wing surfacing at the right side of the aircraft will at the same time act, through the right hand link 59, to take up what would otherwise be slack in the right hand cable 74R.

As to the vertical or pitching control, essentailly the same structure is made use of in the rear wing, but the left and right control cables 75L, 75R (see FIG. 1), which are coupled to the rear control links 64, 64, are operated in unison. From the links 64, 64, these two cables pass over pulleys 76, 76, respectively, mounted upon the wing spars 28, 28; and are joined to a common cable 77, which extends forwardly, mid-way of the fuselage, then around a pulley 78 which may be carried by a bracket upon the upright tube 19, and from said pulley, the said cable 77 passes back and is coupled to the upper arm 79 fixed on the upper end of the pilot's control stick 67. It will be obvious that when the pilot pushes the control stick forward (FIG. 8) on its pivot 68, the arm 79 will be swung backwards. The cable 77 will be pulled, and this will lower the links 64, 64, pulling down upon the trailing edges of all four panels of the rear wing as shown at 61D, 61D, 62D, 62D. This will increase the lift on the rear wing, and will tend to raise the tail of the aircraft as indicated by the arrow U in FIG. 13, thus causing a nosing down or downward pitch of the aircraft.

Similarly, but oppositely, when the pilot pulls the stick back, for a nose-up operation, the relaxing on the pull of the cable 77 and its rear branches 75L and 75R, will permit the trailing edge areas of the four rear panels of the rear rhombic wing to bow upwardly, as shown at 61U, 61U, 62U, 62U, in FIG. 14, thereby tending to move the tail of the aircraft as shown by the arrow D, thus raising the nose of the craft.

A mid-position of the pilot's stick, in the longitudinal sense, produces a more or less neutral configuration of the tail surfaces, as indicated by the level lines N in FIG. 15, and as would be normal for a steady cruising state of the aircraft. This Figure also shows the rudder 65 in its mid position—as for straight-away cruising flight.

The rudder control is by left and right cables 81L, 81R, coupled to the rudder horns 66, passing forwardly over the respective pulleys 82, 82, 83, 83, and extending forwardly for coupling to the left and right rudder pedals 84, 84.

Adjustment of the normal setting of the trailing edges of the sail-like front wing panels may be made by means of adjusting the length of lateral control wires 74R and 74L, or by coupling them at various points on the lever 73, as shown at 73a in FIG. 8.

Similarly, cable length 77 (for the elevator or pitching control) may be varied, or said cable may be variously coupled to arm 79, as shown at 79a. This control preferably has a bias or bungee spring 80, extending from stick 67 to rock shaft 69, the tension of which spring can be adjusted by hooking it to the stick at various points indicated at 67a. The bias need only be in the sense to urge the trailing portions of the rear wing panels downwardly, since the normal lifting action on said portions tends to raise them. Thus the bungee 80 acts on the pitching control of the aircraft in a nosing-down sense, which not only relieves the pilot of some work but also serves as something of a safety factor.

The rudder control cables 81L, 81R, may likewise be adjusted as to length, and/or by variously hooking them to the pedals, as indicated at 84a in FIG. 8. Each pedal is pivoted at 85 in a frame 86, which also carries the fuel tank 41. Bungee springs 90, on the rudder pedals 84, may also be adjustably connected to the two pedals, so as to tend to centralize the rudder, as well as to keep slack out of the cables 81L and 81R.

The mounting frame 86 may be adjusted along the longerons 17, as by means of straps 87 and bolts 88. Thus, the fuel tank 41 will also be adjusted, as it is preferably carried on the frame 86. The position of the pilot may also be altered by moving the clamping brackets 32 and cross-brace 17e along the longerons 17. Convenience, comfort and variation of C.G. location, may thus be readily achieved.

FIGS. 9 and 9A illustrate an alternative control arrangement with respect to the stick. Here the rock shaft 69 is pivoted by bearings or hinges 71a, 72a, beneath the frame 86. The control stick 91 is pivoted, at its lower end, by pivot 68a to the rock shaft. To the depending lever 92 is adjustably secured a longitudinal bungee spring 80a and the pitching control cable 77 which passes over a pulley 93, thence upwardly and over pulley 78, and finally rearwardly.

In this form the rudder control system is identical with that of FIG. 8.

The lateral control is altered somewhat, in order to obtain adequate throw, and in the correct, instinctive sense. Hence, the lateral control arm 94, which extends upwardly from rock shaft 69 (in the embodiment of FIGS. 9 and 9A), carries a cross-arm 95. As seen from the front (FIG. 9A), the left wing tension control cable 74L is coupled to the right-hand end of the cross-arm; while the right wing tension control cable 74R is coupled to the lefthand end of the cross-arm.

In conclusion, it may well be pointed out that the triangulated arrangement of the compression members of fuselage and wings provides a very strong rigid and integrated whole; while the flexible wing surfacing, and also the doubly-diagonal wires, act in tension and in cooperation with the compression system; all as illustrated and described; so that a light-weight, stable, and inexpensive aircraft, highly controllable, even at very low speeds, is provided. The controls are obviously extremely simple; adjustments, wherever needed or desired, are all available; and the cost of assembling, disassembling, inspection, maintenance, repair, and replacement of parts, is unusually low.

Thus, many of the features and combinations herein described and/or illustrated represent substantial advantages in the aircraft art, and they are hence deemed to be significant elements of the present invention; and it is to be understood that the features and combinations involved in the appended claims are to be taken as including all proper alternatives and equivalents within the broadest possible scope of each claim as construed in the light of the prior art.

I claim:

1. An aircraft having a major longitudinal strength structure generally centralized in the vertical midplane,
   shallow V-shaped wing structures, viewed from above, secured to said strength structure, one at the top and one at the bottom of said strength structure, said wing structure comprising paired upper and lower panels, and
   control linkages being positioned and connected to act as stays between said paired upper and lower wing panels.

2. The aircraft of claim 1, with said wing structure having controllable surfacing normally aerodynamically loaded in a positive lift sense, and said aircraft having a pilot seat and control member centered along the bottom of said major strength structure, and tension linkage coupled to said surfacing and to said control member.

3. The construction of claim 2, wherein such controllable surfacing is located toward the rear of the aircraft, the said control member is movable in a fore-and-aft sense, and such tension linkage pulls the surfacing downwardly upon forward movement of said member.

4. The construction of claim 3, with an adjustable bungee for said control member.

5. The construction of claim 2, wherein such controllable surfacing comprises differentially-actuable areas at opposite sides of the aircraft, the said control member is movable in a transverse sense, and such tension linkage is coupled thereto and to said differentially-actuable areas in such manner as to actuate said areas differentially by differential tensions at the two sides.

6. For an aircraft, a sustaining wing of substantially rhomboidal cellular configuration viewed from the side and axially of the aircraft so that there are upper and lower pairs of panels converging toward the wing tips, said panels being of substantially sail-like construction in at least their aft area, and having rigid upwardly-convex ribbing flexibly mounted and positioned generally axially of the aircraft to maintain a generally aeroform contouring of the wing panels.

7. The wing of claim 6, having one pair of its panels swept back.

8. The wing of claim 7, wherein the upper panels are swept back.

9. The wing of claim 6, having one pair of its panels swept forward.

10. The wing of claim 9, wherein the lower panels are swept forward.

11. The wing of claim 6, having one pair of its panels swept back and the other pair of its panels swept forward.

12. The construction of claim 6, having controls coupled to trailing edges of at least two of the wing panels.

13. The construction of claim 12, wherein said controls comprise linkages coupled to said trailing edges for operating normally in tension only.

14. The construction of claim 12, wherein said controls are operative differentially.

15. The construction of claim 12, wherein said controls are operative in unison.

16. The construction of claim 6, wherein the sail-like wing construction has lacing securing it in place, said lacing providing for adjustment to vary the effective camber of the wing.

17. In an aircraft, a plurality of cellular wings, one adjacent the front and another adjacent the rear of the craft, each of said wings, when viewed longitudinally and from the side of the aircraft, appearing substantially rhomboidal with one of its diagonal axes extending transversely of the aircraft and the other vertically, the upper and lower surfaces of each of said wings being differentially swept wherein said wings have flexible trailing edges, the upper and lower surfaces of the forward of said wings being interconnected, adjacent their trailing edges, by independent linkages which are oppositely controllable.

18. The construction of claim 17, wherein the upper surfaces of the rearward of said wings are interconnected, adjacent their trailing edges, by linkage actuable to move them in like senses to serve as a pitching control.

19. In an aircraft, a plurality of cellular wings, one adjacent the front and another adjacent the rear of the craft, each of said wings, when viewed longitudinally and from the side of the aircraft, appearing substantially rhomboidal with its longer axis extending transversely of the aircraft, the upper and lower surfaces of each of said wings being formed substantially as a sail, and having curved rib means establishing a lifting curvature for such sail.

20. The construction of claim 19, wherein the rib means of upper and lower surfaces are interconnected adjacent their rear ends by control linkage.

* * * * *